US012072924B2

(12) United States Patent
Zhang et al.

(10) Patent No.: US 12,072,924 B2
(45) Date of Patent: *Aug. 27, 2024

(54) GENERATING BREAKPOINTS IN MEDIA PLAYBACK

(71) Applicant: Google LLC, Mountain View, CA (US)

(72) Inventors: Wenbo Zhang, Mountain View, CA (US); Son Khanh Pham, Mountain View, CA (US); Karthik Prabhakar, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/090,852

(22) Filed: Dec. 29, 2022

(65) Prior Publication Data

US 2023/0142444 A1 May 11, 2023

Related U.S. Application Data

(63) Continuation of application No. 16/901,717, filed on Jun. 15, 2020, now Pat. No. 11,550,839.

(51) Int. Cl.
*G06F 16/438* (2019.01)
*G06F 16/435* (2019.01)
*G06F 16/48* (2019.01)
*G06N 3/02* (2006.01)
*G06N 20/00* (2019.01)

(52) U.S. Cl.
CPC ........ *G06F 16/4387* (2019.01); *G06F 16/435* (2019.01); *G06F 16/48* (2019.01); *G06N 3/02* (2013.01); *G06N 20/00* (2019.01)

(58) Field of Classification Search
CPC .... G06F 16/4387; G06F 16/435; G06F 16/48; G06N 20/00; G06N 3/02
See application file for complete search history.

(56) References Cited

U.S. PATENT DOCUMENTS 9,088,823 B1 * 7/2015 Price .................. H04N 21/2668
9,736,503 B1 8/2017 Bakshi et al.
(Continued)

FOREIGN PATENT DOCUMENTS

WO WO 2009033002 3/2009
WO WO-2009033002 A1 * 3/2009 ........... G11B 27/034

*Primary Examiner* — Fan S Tsang
*Assistant Examiner* — David Siegel
(74) *Attorney, Agent, or Firm* — Fish & Richardson P.C.

(57) ABSTRACT

Methods, systems, and apparatus, including computer programs encoded on a computer storage medium, for determining breakpoints in a media item. Methods can include determining a candidate set of breakpoints within a media item. A machine learning model is used to generate a score for each particular candidate breakpoint in the set of candidate breakpoints based on presentation features of the media item. A subset of candidate breakpoints is selected from the set of candidate breakpoints based on the score. A final set of breakpoints is selected from the subset of candidate breakpoints based on a combination of the score for each particular candidate breakpoint and a location of the particular candidate breakpoint relative to a different candidate breakpoint. The final set of breakpoints is stored in a database and during playback of the media item, a digital component is presented when the media item reaches a stored breakpoint.

18 Claims, 5 Drawing Sheets

(56) References Cited

U.S. PATENT DOCUMENTS

| | | | |
|---|---|---|---|
| 9,743,156 B1 | 8/2017 | McLean et al. | |
| 10,841,666 B1 * | 11/2020 | Effinger | G06N 3/08 |
| 2019/0035431 A1 * | 1/2019 | Attorre | G10L 25/30 |

* cited by examiner

GENERATING BREAKPOINTS IN MEDIA PLAYBACK

CROSS-REFERENCE TO RELATED APPLICATIONS

This application is a continuation application of, and claims priority to, U.S. patent application Ser. No. 16/901,717, titled "GENERATING BREAKPOINTS IN MEDIA PLAYBACK," filed on Jun. 15, 2020. The disclosure of the foregoing application is incorporated herein by reference in its entirety for all purposes.

BACKGROUND

This specification relates to data processing and analysis of media items.

The Internet provides access to media such as a video clip, an audio clip or a multimedia clip that are provided by a media distribution system (e.g., a search platform, a social media platform, or another platform that hosts digital contents). Users can use applications (e.g., a web browser, a native application) executing on client devices such as smartphones, tablets and personal computers to view such media items.

The digital component system may also provide digital components (e.g., content that is not part of, or originally included in, the media item) for presentation on the client device during playback of the media item. In such a scenario, the media item that is presented on the client device is paused at a particular time during the playback of the media item (referred to as breakpoint) and one or more digital components that are provided by the digital component system are presented. The presentation of the media item is resumed after the digital components have been presented or after a duration of the breakpoint has elapsed.

SUMMARY

In general, one innovative aspect of the subject matter described in this specification can be embodied in methods including the operations of determining, a candidate set of breakpoints within a media item; generating, using a machine learning model that includes a plurality of parameters, a score for each particular candidate breakpoint in the set of candidate breakpoints within the media item based on presentation features of the media item at the particular candidate breakpoint; determining, a subset of candidate breakpoints from the set of candidate breakpoints based on the score output by the machine learning model, wherein the subset of candidate breakpoints includes fewer than all of the candidate breakpoints in the set of candidate breakpoints; selecting a final set of breakpoints from among the subset of candidate breakpoints based on a combination of the score generated by the machine learning model for each particular candidate breakpoint and a location of the particular candidate breakpoint relative to a different candidate breakpoint in the subset of candidate breakpoints; storing, in a database, the final set of breakpoints for the media item; and during playback of the media item, providing, to a client device, a digital component that is presented at the client device when the media item reaches a given breakpoint among the final set of breakpoints stored for the media item, wherein the digital component is not included in the media item.

Other embodiments of this aspect include corresponding methods, apparatus, and computer programs, configured to perform the actions of the methods, encoded on computer storage devices. These and other embodiments can each optionally include one or more of the following features.

Methods can further include determining a first set of features of multiple entities detected within a portion of the media item that is within a specified distance of a first candidate breakpoint; determining, for the first candidate breakpoint, a second set of features representing the presentation features of the media item at different incremental distances from the first candidate breakpoint, wherein the second set of features is different from the first set of features of the first candidate breakpoint; and generating, using the machine learning model, the score for the first candidate breakpoint based on the first set of features and the second set of features.

Methods can include generating a set of training data based on the first set of features, the second set of features and a ground truth score; and adjusting a plurality of trainable parameters of the machine learning model using the set of training data to generate a trained machine learning model that outputs a breakpoint score indicative of a level of disruption that will be caused by inserting a breakpoint at a particular location during playback of the media item. The machine learning model can include a bi-directional gradient recurring unit and fully connected neural network layers.

Methods can include selecting multiple random sets of breakpoints from among the subset of candidate breakpoints; determining a reward for each random set of breakpoints from among the multiple random sets of breakpoints; selecting a subset of random sets of breakpoints from among the multiple random sets of breakpoints based on the reward of each random set of breakpoints; and generating new random sets of breakpoints from the subset of random sets of breakpoints.

Methods can include determining a reward for the random set of breakpoints. Determining the reward can include determining the reward based on a difference between (i) a watch-weighted sum of the score generated by the machine learning model for each candidate breakpoint in the random set of breakpoints and (ii) a spacing penalty corresponding to a proximity of each candidate breakpoint in the random set of breakpoints to other candidate breakpoints in the random set of breakpoints.

Methods may further include determining a candidate set of breakpoints, which can include filtering out breakpoints that are within a specified distance from a start of the media item or that occur while speech is being presented by the media item.

Particular embodiments of the subject matter described in this specification can be implemented to realize one or more of the following advantages. For example, the techniques discussed throughout this document can programmatically evaluate candidate locations within media items at which breakpoint can be inserted, and generate a list of breakpoints at the locations within the media items that are predicted to be less disruptive to playback of the media items.

Playback of a media item is paused (or otherwise ceased) when a breakpoint in the media item is encountered, and a digital component can be presented while the media item is paused. However, pausing playback of the media item to present a digital component can disrupt user experience. For example, the level of disruption to a user watching a video on a client device may be higher when there is a higher amount of activity (e.g., video motion or audio) occurring in the video (e.g., relative to when less activity is occurring). As such, breakpoints should be inserted into media items in such a way that it reduces the disruption of the user experience. For example, encountering a breakpoint in a media item, such as a video, during an intense conversation that is being depicted within the video disrupts the user experience of watching the video more than encountering a breakpoint between two different scenes of a video when there is little to no activity (e.g., speech or video motion). The techniques discussed throughout this document lead to insertion of breakpoints at times that are less disruptive during playback of a media item.

The techniques discussed throughout this document can evaluate an entire duration of a media item using a machine learning model to identify those locations within the media item at which breakpoint insertion is appropriate (e.g., where the breakpoint will be least disruptive to users viewing the media item). More specifically, a multi-pass technique can be used in which a subset of candidate breakpoints is initially identified from among all possible breakpoints within a media item based on a score output by a machine learning model, and then each breakpoint in the subset of candidate breakpoints is ranked based on a combination of the score output by the machine learning model and the location of that breakpoint relative to other candidate breakpoints in the subset. This multi-pass technique enables optimizing the selection of candidate breakpoints based on their level of disruptiveness given the characteristics of the media item (e.g., as evidenced by the score output by the machine learning model), while also considering the relative locations of breakpoints relative to one another, e.g., so that breakpoints are placed too close together. Furthermore, the techniques discussed herein can consider not only the characteristics of the media item at the proposed location of the candidate breakpoints, but also the characteristics of the media item in frames leading up to, and/or following, the location of the candidate breakpoints.

The techniques discussed herein can reduce aborted views of media items that may be caused by inappropriately placed breakpoints, which reduces wasted computing resources that are utilized to present media items with inappropriately placed breakpoints. For example, less memory will be allocated to storing and distributing media items that include inappropriately placed breakpoints by generating the breakpoints using the techniques discussed herein. Additionally, bandwidth allocated to delivering media items to client devices will be more efficiently utilized by generating breakpoints that will lead to complete views of the media items, rather than using that bandwidth to deliver media items that will be stopped during playback because of poorly placed breakpoints.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Client devices (e.g., smart phones, tablet, and personal computers) connected to the internet can be provided media items by a media distribution system (e.g., a search platform, a social media platform, or another platform that hosts digital contents). These media items can include breakpoints that pause, or otherwise halt, playback of the media item for a period of time so that digital components, not included in the media item, can be presented to the user of the client device. As used throughout this document, the phrase "digital component" refers to a discrete unit of digital content or digital information (e.g., a video clip, audio clip, multimedia clip, image, text, or another unit of content). Generally, digital components are separate from the media items, and are selected for presentation based on the context in which the media items are being played (e.g., day, time, user characteristics, device characteristics). For example, digital components can be selected by, and provided by, a different system (e.g., a digital component system) than the system that provides the media item. Furthermore, the digital components are generally created by an entity other than the entity that created the media item, and therefore, are considered third party content relative to the media item.

To facilitate presentation of digital component during playback of the media item, the media item includes (or references) a list of breakpoints that have been generated for the media item. Breakpoints specify timestamps within the duration of the media item where playback of the media item can be halted, and where digital components can be presented. For example, assume that the user is using the client device to watch a video provided by the media distribution system as a streaming service. Also assume that the duration of the particular video that is being presented on the client device is 10 minutes and that the particular video includes a breakpoint at 5 minutes after the beginning of the media item. In such a scenario, the application that is presenting the particular video can determine (e.g., from the list of breakpoints for the particular video) that a breakpoint is located at the 5 minute playback point within the video. Based on this determination, the application can pause (or otherwise halt) playback of the particular video when playback reaches the 5 minute breakpoint, and present the digital component that is provided by the digital component system while playback of the particular video is halted. After presentation of the digital component (or at an end of the breakpoint duration), the application resumes presentation of the particular video.

As described in more detail below, the breakpoints for media items can be selected in a manner that reduces the disruption to playback of the media items. More specifically, a subset of all potential candidate breakpoints for a given media item can be selected based on their level of disruptiveness. The level of disruptiveness for each candidate breakpoint can be assessed, for example, based on an output from a machine learning model that has been trained to predict the disruptiveness of breakpoints based on characteristics of the given media item at a time of the candidate breakpoint and based on characteristics of frames of the given media item that are within a specified distance (e.g., amount of time or number of frames) of the time of the candidate breakpoint. The subset of the candidate breakpoints having the lowest predicted level of disruptiveness (e.g., according to the scores output by the machine learning model) can then be ranked based on one or more criteria, such as the relative proximity of each candidate breakpoint to other candidate breakpoints, in combination with the predicted level of disruptiveness. This ranking can then be used to select a threshold number of highest ranked breakpoints that will be used as final breakpoints for the given media item.

Figure 1:
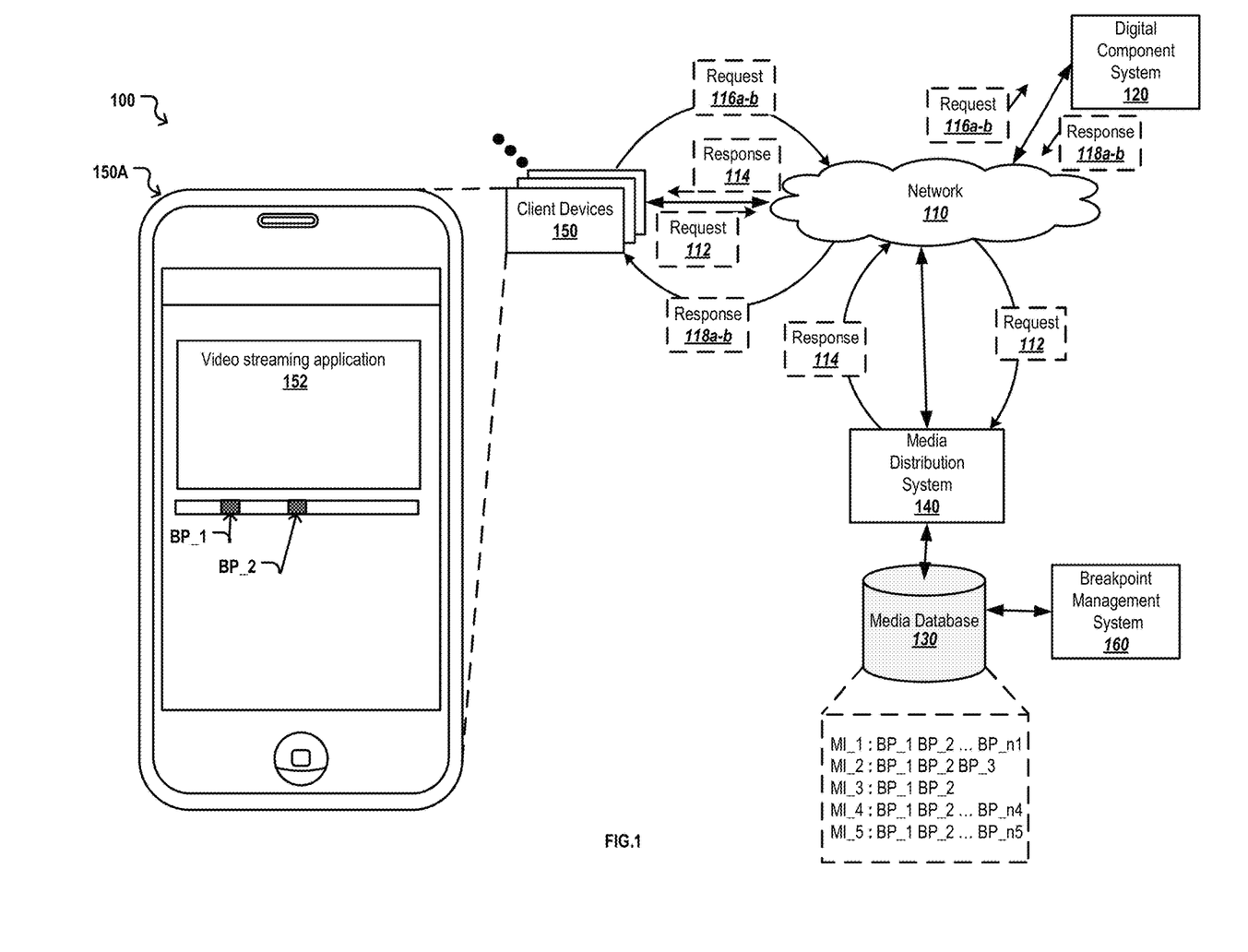
FIG. 1 is an example environment in which media items and digital components are distributed and presented to a client device.

FIG. 1 is an example environment 100 in which media items and digital components are distributed and presented to a client device. The example environment 100 includes a network 110. The network 110 can include a local area network (LAN), a wide area network (WAN), the Internet or a combination thereof. The network 110 can also include any type of wired and/or wireless network, satellite networks, cable networks, Wi-Fi networks, mobile communications networks (e.g., 3G, 4G, 5G, and so forth) or any combination thereof. The network 110 can utilize communications protocols, including packet-based and/or datagram-based protocols such as internet protocol (IP), transmission control protocol (TCP), user datagram protocol (UDP), or other types of protocols. The network 110 can further include a number of devices that facilitate network communications and/or form a hardware basis for the networks, such as switches, routers, gateways, access points, firewalls, base stations, repeaters or a combination thereof. The network 110 connects client devices 150, a digital component system 120, a media database 130 and a media distribution system 140.

A client device 150 is an electronic device that is capable of requesting and receiving resources over the network 110. Example client devices 150 include personal computers, tablet devices, wearable devices, digital assistant devices (e.g., smart speakers), mobile communication devices, and other devices that can send and receive data over the network 110. A client device 150 typically includes a user application, such as a web browser, to facilitate the sending and receiving of data over the network 110, but native applications executed by the client device 150 can also facilitate the sending and receiving of data over the network 110. For example, 150A is an example smartphone device executing a video streaming application 152. In some situations, the input accepted by the client devices 150 include audio (e.g., voice) input that is received through a microphone of the client device. Similarly, the output provided by the client devices 150 can be audio (e.g., synthesized speech) output that is presented using a speaker that is part of the client device.

Client devices 150 generate media requests 112, which are transmitted over the network 110 to the media distribution system 140. For example, the client device 150A can generate the media request 112 in the form of a packetized data request including a header and payload data. The media request 112 can include event data specifying features, such as a name (or network location) of a server from which media is being requested, a name (or network location) of the requesting device (e.g., the client device 150), and/or information that the media distribution system 140 can use to select one or more media items (e.g., different portions of media) provided in response to the request. The media request 112 is transmitted, by the client device 150, over the network 110 (e.g., a telecommunications network) to a server of the media distribution system 140.

Media requests 112 can include event data related to other information, such as information that a user of the client device has provided, geographic information indicating a state or region from which the media request 112 was submitted, or other information that provides context for the environment in which the requested media will be displayed (e.g., a time of day of the component request, a day of the week of the component request, a type of device at which the requested media will be displayed, such as a mobile device or tablet device). Media requests 112 can be transmitted, for example, over a packetized network, and the media requests 112 themselves can be formatted as packetized data having a header and payload data. The header can specify a destination of the packet and the payload data can include any of the information discussed above.

The media distribution system 140, selects media items from the media database 130 that will be presented to the client device 150 in response to receiving the media request 112 and/or using information included in the media request 112. In some implementations, the media database 130 includes millions of available media items that are indexed. Each media item index entry can reference the corresponding media item and specify one or more breakpoints that have been defined for the media item. For example, the breakpoints (BP_1-BP_n1) for media item (MI_1) at index 1 has n1 number of breakpoints. Each breakpoint refers to a different point of time within the duration of the media item when digital components can be presented during playback of the media item. When playback of a media item reaches the defined location of a breakpoint (e.g., a specified amount of playback time has elapsed), playback of the media item can be halted, thereby enabling presentation of a digital component that is not part of the media item. In some situations, each breakpoint can have a defined length (e.g., 10 second, 15 seconds, or another appropriate amount of time), and when the defined length has passed (e.g., the specified amount of time elapsed since presentation of the media item has been halted), playback of the media item can be resumed. In some situations, the breakpoints may not have a defined length. In these situations, the playback of the media item can be resumed once presentation of the digital component has completed.

For purposes of example, assume that the client device 150A generates a media request 112 for the media item (MI_3) at index 3 in the media database 130. The media distribution system 140, after receiving the media request 112, generates a response 114 that includes data required to present the corresponding media item (MI_3) from the media database 130 along with a list of breakpoints (BP_1-BP_2) that have been defined for that corresponding media item. The response 114 is transmitted over the network 110 to the client device 150A. The client device 150A uses the data received in the response 114 to present the media item MI_3 by rendering the media item, for example, in a video streaming application 152 executing on the client device 150A.

In some situations, the client device 150A after receiving the response 114 generates a request 116a-116b for digital components based on the list of breakpoints (BP_1-BP_2). Depending on the particular implementation, the client device can either generate individual requests for digital components for each breakpoints in the list of breakpoints or generate a single request for digital components for all the breakpoints in the list of breakpoints. For example, the client device 150A can generates two separate requests 116a and 116b for digital components to be presented at each of the breakpoints BP_1 and BP_2 in the list of breakpoints. The digital component system 120, after receiving each of the requests 116a and 116b, generates responses 118a and 118b, respectively that each includes one or more digital components, and transmits it to the client device 150A. The client device 150A halts the presentation of the media item MI_3 during the breakpoints BP_1 and BP_2 and presents the digital components that were included in the responses 118a and 118b, respectively.

In some situations, breakpoints can be very disruptive to the presentation of media items. For example, if a breakpoint is located at a point in the media item where a person is speaking or where an action scene is about to conclude, this can be much more disruptive to presentation of the media item (e.g., viewing of the media item by users), than breakpoints that are located at a point in the media item where an action scene has already concluded and/or no one is talking.

Disrupting the playback of the media item can lead to users aborting playback of the media item entirely (e.g., closing out presentation of the media item), which can lead to a high level of wasted computing resources. For example, all of the bandwidth used to download the media item to the client device 150A, store the media item at the client device 150A, and present the media item at the client device may be considered wasted when a user aborts playback of the media item due to a disruptive breakpoint. To reduce the wasted resources caused by disruptive breakpoints in media items, techniques discussed throughout this document can be used to generate breakpoints that are located at less disruptive locations within the media item. To facilitate the analysis of media items for determining the breakpoints, the environment 100 includes a breakpoint management system 160. In some implementations, the breakpoint management system 160 includes one or more processors and a memory device. As discussed in more detail below with reference to FIGS. 2-5, the breakpoint management system 160 implements a combination of machine learning models and search techniques to process and analyze each media item to determine a set of breakpoints that limit the disruption to playback of the media item.

Figure 2:
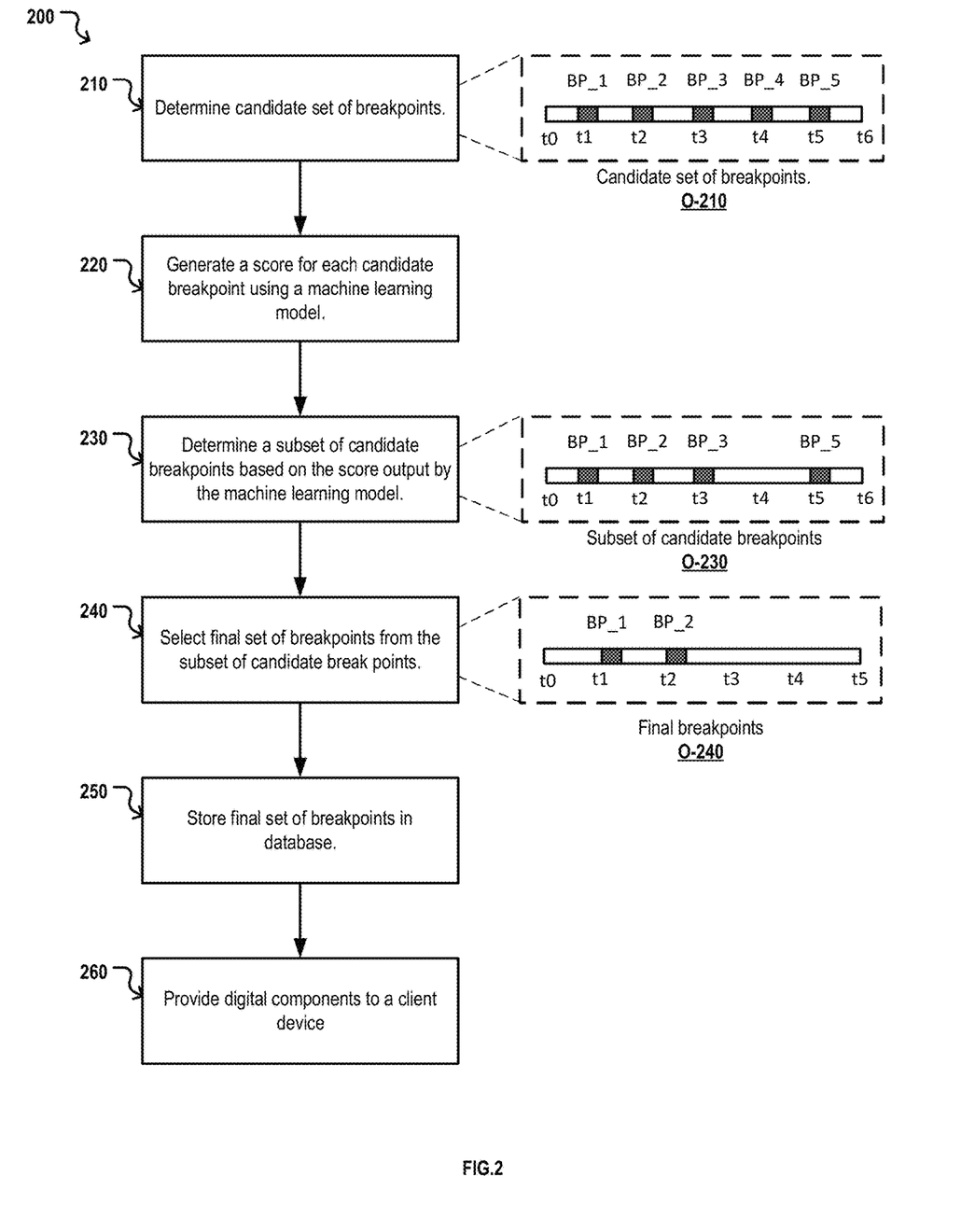
FIG. 2 is a flow chart of an example process for generating breakpoints in a media item.

FIG. 2 is a flow chart of an example process 200 for generating breakpoints in a media item. FIG. 2 also shows example outputs of several individual steps within the process 200 to provide illustrative examples. Operations of the process 200 can be implemented, for example, by the breakpoint management system 160 to analyze media items in the media database 130, and determine a final set of breakpoints that will be used to present digital components during playback of the media items. Operations of the process 200 can also be implemented as instructions stored on a computer readable medium, where execution of the instructions can cause one or more data processing apparatus to perform operations of the process 200.

A candidate set of breakpoints within a media item is determined (210). In some implementations, the candidate set of breakpoints is an initial set of breakpoints (e.g., locations within the media item) that meet one or more filtering criteria. For example, the candidate set of breakpoints can be selected from among all locations within the media item by filtering out breakpoints that are within a specified distance from a start of the media item.

In some implementations, a heuristic and/or rule based approach is implemented wherein certain heuristics and/or rules are implemented to determine the candidate set of breakpoints. For example, a creator of the media item or a system that distributes the media item may indicate that no digital components should be presented within a specified amount of time (or within a specified number of frames) of the beginning of the media item. The reasoning behind this restriction can be based on the determination that presentation of digital components (or other content that is not part of the media item) within the first X seconds or minutes (or X number of frames) of playback of the media item are too disruptive to be allowed. The specified distance can be determined, for example, based on a statistical analysis of watch times of users when breakpoints are located at various locations near the beginning of media items. For example, a system can select the specified distance by identifying the location at which the impact of a breakpoint on users continuing to watch the media item falls below a specified level. More specifically, the specified distance can be the location of media items at which the rate of users that abort playback of media items at the location of the breakpoint (or within a specified distance of the breakpoint) falls below a specified rate.

In some implementations, the candidate set of breakpoints is determined by filtering out locations within the media item at which speech is being presented by the media item. Inserting breakpoints at locations of the media item where speech is occurring may be deemed so disruptive that they should not be considered as candidate breakpoints. Therefore, filtering out the set of all possible breakpoints to remove those that occur while speech is being presented by the media item can reduce the number of candidate breakpoints that need to be fully analyzed, and thereby reduce the processing requirements for identifying breakpoints for a media item. Some example filter criteria have been discussed above for purposes of example, but other filtering criteria can also be used.

A machine learning model is used to generate a score for each particular breakpoint in the set of candidate breakpoints (220). In some implementations, the machine learning model has a plurality of trainable parameters that are trained to generate scores for breakpoint in the candidate set of breakpoints based on presentation features of the media item at the location of the particular candidate breakpoint such that the score represents the level of disruptiveness of the particular candidate breakpoint.

In some situations, the machine learning model can also use features selected within a specified distance from the location of the particular breakpoint to generate the score for the particular breakpoint. For example, a first set of features of multiple entities that are detected within a portion of the media item can be determined. This set of features and/or the multiple entities can be detected within any frame of the media item that is within a specified distance (e.g., amount of time or number of frames) of the particular candidate breakpoint for which the score is being generated. The specified distance can be selected, for example, by an administrator of the system implementing the process 200.

What constitutes an "entity" may depend on the particular implementation and in particular the choice of the designer. For example, assume that the media item, such as a video, shows a "human" in the portion of the media item between the timestamps t−4 and t+4. In such a scenario the "human" can be considered an entity. In another example, an "entity" can include multiple objects or type of objects depicted in the portion of the media item between the timestamps t−4 and t+4. In such implementations, the context in which the object is depicted within a media item may form basis for selecting the particular object as an "entity". For example, objects that can be considered as entities may include cars, animals or any animate or inanimate object. In some implementations, each detected entity within the portion of the media item is represented by multiple features such as the position of the entity in the portion of the video, a bounding box corresponding to the portion of the display area occupied by the entity, and/or the label assigned to identify the entity or entity type.

Continuing with the example above, a second set of features can also be determined for the particular candidate breakpoint for which the score is being generated. The second set of features differs from the first set of features, and can represent presentation features of the media item at different incremental distances from the particular candidate breakpoint. For example, assume that a breakpoint for a media item has a timestamp t. Also assume that the specified distance as set by the designer of the system is 4 seconds. In such implementations, the portion of the media item between the timestamps t−4 and t+4 is analyzed for sequential features at each incremental distance t−4 to t+4. Examples of sequential features for a media item such as a video may include brightness or the light spectrum recorded at each time interval from t−4 to t+4 of the portion of the media item. In another example, sequential features for a media item such as an audio may include amplitude of multiple frequencies of the audio at each time interval from t−4 to t+4 of the portion of the media item. Still other features can include features indicative of a level of motion of an entity over the time interval (e.g., t−4 to t+4).

In some implementation, the machine learning model can either be a regression model that generates a score for a breakpoint or a classification model that performs a classification task of classifying a breakpoint as "Good" or "Bad", a "Good" classification corresponds to a candidate breakpoint that is predicted to be non-disruptive, and a "Bad" classification corresponds to a candidate breakpoint that is predicted to be disruptive. In some implementations, the machine learning model can also generate a likelihood of whether a breakpoint is "Good" or "Bad". For example, assume that for a particular breakpoint from among the multiple breakpoints in the candidate set of breakpoints, the output of the machine learning model is in the form of a likelihood of whether a breakpoint is "Good". If the likelihood of the particular breakpoint is a number on a scale from 0-10, where a number closer to 0 indicates that the particular breakpoint has a lower determined likelihood of being "Good" (e.g., a lower likelihood of being non-disruptive), and a number closer to 10 indicates a higher likelihood that the particular breakpoint has a higher determined likelihood of being "Good" (e.g., a higher likelihood of being non-disruptive). Of course, the likelihood of the breakpoint can be expressed using any appropriate scale.

Figure 3:
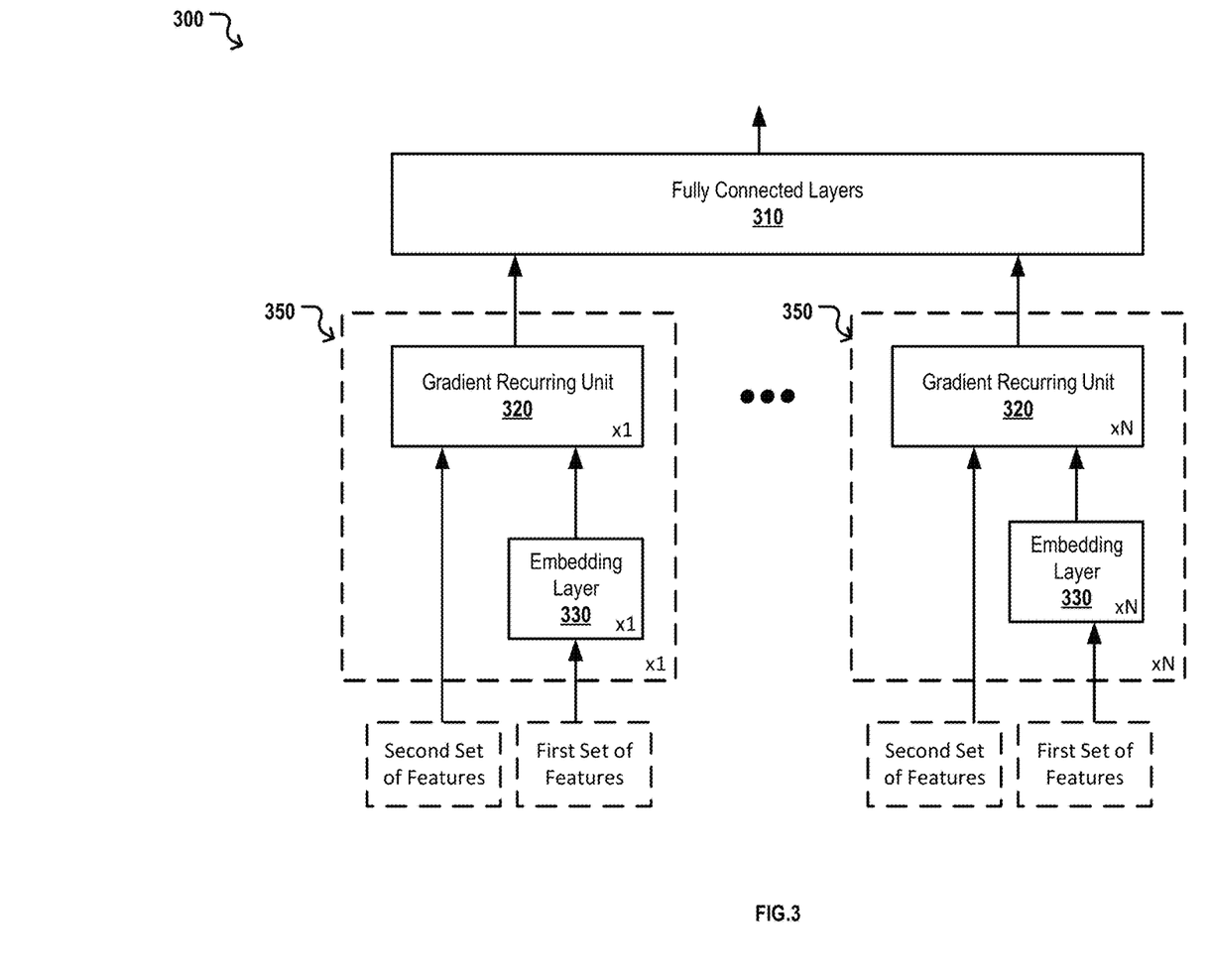
FIG. 3 is a block diagram of an example architecture of a machine learning model trained to generate a score for each breakpoint in the candidate set of breakpoints.

FIG. 3 is a block diagram of an example architecture of a machine learning model trained to generate a score for each breakpoint in the candidate set of breakpoints. The machine learning model makes use of fully connected neural network layers, multiple gradient recurring units and embedding layers. For example, the example machine learning model includes a fully connected layer 310, gradient recurring unit 320 and embedding layer 330.

In the example machine learning model, the first set of features is provided as input to the embedding layer 330 wherein the embedding layer 330 processes the first set of features to generate as output, an intermediate representation of the first set of features. The hyper-parameters of the embedding layer 330 are selected based on the design requirements such as the dimensions of the intermediate representation when provided with the first set of features as input, especially when the first set of features are discrete. The second set of features is also provided as input to the gradient recurring unit 320.

In some implementations, portions of the machine learning model has a recurring neural network architecture. For example, the gradient recurring unit (320) has a bi-directional recurring neural network architecture. In such implementations, the recurring portion of the machine learning model takes as input data that corresponds to multiple timestamps (sequential data). In the current example, the gradient recurring unit 320 and the embedding layer 330 are recurring portions 350 of the machine learning model that takes as input the first set of features and the second set of features at each time interval within the specified distance from the training breakpoint.

The output of the gradient recurring unit 320 is further provided as input to the fully connected layers 310. After processing the input, the fully connected layers 310 generates a score output. In some implementations, the score output is a regression value that provides a score for a particular breakpoint. For example, the score output can be a value in a scale of 0 to 10. In another implementation, the machine learning model can perform a classification task of classifying a breakpoint into "Good" or "Bad".

The training process of the machine learning model further requires a set of training samples. Each training sample includes a first set of features, a second set of features, and a ground truth rating and/or score corresponding to a training breakpoint.

In some implementations, the ground truth rating and/or score for each sample in the set of training samples is acquired from human evaluators. In such implementations, human evaluators analyze the training breakpoint in a media item and provide a rating and/or score for the training breakpoint in the media item. For example, a human evaluator can be provided a media item, such as a video, and during the process of viewing the video, the media item is paused at the location of the training breakpoint to simulate actual viewing experience of a user. In response, the human evaluator provides a rating and/or score representing the level of disruptiveness of the training breakpoint. That rating or score representing the level of disruptiveness is accepted as a ground truth rating and/or score for the training breakpoint. In situations where multiple human evaluators provide individual rating and/or score for a particular training breakpoint, the final ground truth rating and/or score can be calculated based on the individual ratings and/or scores provided by all human evaluators. For example, the ground truth rating and/or score can be calculated using the average (or another measure of central tendency) or the weighted sum of the individual ratings.

The training process of the machine learning model retrieves from a memory location a respective parameter, modifies the respective parameter using a machine learning training algorithm executed by the processor, and stores the modified respective parameters in the memory location. The training is typically performed iteratively with each parameter being retrieved from memory, modified and stored multiple times. The training process can be performed efficiently using multiple processing threads to modify respective parameters in parallel.

In some implementations, the objective and/or loss function that the training process tries to optimize is a weighted cross entropy loss based on the predicted score of the machine learning model and the ground truth score. In such implementations, the associated cost function and the objective function is defined as follows $$\text{Cost}(W, Y, \hat{Y}) = \frac{1}{m}\sum_{i=1}^{m} \text{Weighted Cross Entropy Loss}(y, \hat{y})^i$$

-continued $$= -\frac{1}{m}\sum_{i=1}^{m}\sum_{c=1}^{3}\lambda^{i}y_{c}^{i}\log\left(\hat{y}_{c}^{i}\right)$$

Objective Function$(W, b, Y, \hat{Y}) = \arg\min_{W,b} \text{Cost}(W, Y, \hat{Y})$ Having now discussed the training of a machine learning model that can be used to generate the scores for the candidate breakpoints in the set of candidate breakpoints, discussion of the process 200 of FIG. 2 resumes.

A subset of candidate breakpoints is determined based on the score output by the machine learning model (230). The subset of candidate breakpoints includes fewer than all of the candidate breakpoints in the set of candidate breakpoints. For example, the subset of the candidate breakpoints may include only those breakpoints that were classified as "Good" by the machine learning model. If the machine learning model generates a score, then the subset of candidate breakpoints may include only those breakpoints that is above a preset threshold chosen by the designer (or an administrator) of the system. For example, assume that the preset threshold is set at 5 by the designer of the system. In this example, the subset of candidate breakpoints will include only those breakpoints that have a score that is more than 5.

Continuing with the example of the media item MI_3 as shown in O-210, assume that the machine learning model generates a score output of 6, 8, 9, 4 and 7 for each of the breakpoints BP_1, BP_2, BP_3, BP_4 and BP_5 respectively. Also assume that the preset threshold is set at 5. In this example, the score output of breakpoints BP_1, BP_2, BP_3 and BP_5 are each greater than the preset threshold, such that these breakpoints are included in the subset of candidate breakpoints as shown in O-230. Meanwhile, breakpoint BP_4 has a score output of 4 which is less than the preset threshold, so it is not included in the subset of candidate breakpoints.

A final set of breakpoints from among the breakpoints in the subset of candidate breakpoints is determined (240). In some implementations, the final set of breakpoints are selected based on a combination of the score generated by the machine learning model for each particular candidate breakpoint and a location of the particular candidate breakpoint relative to a different candidate breakpoint in the subset of candidate breakpoints. The selection of the final set of breakpoints is described in detail with reference to process 400 as shown in FIG. 4.

Figure 4:
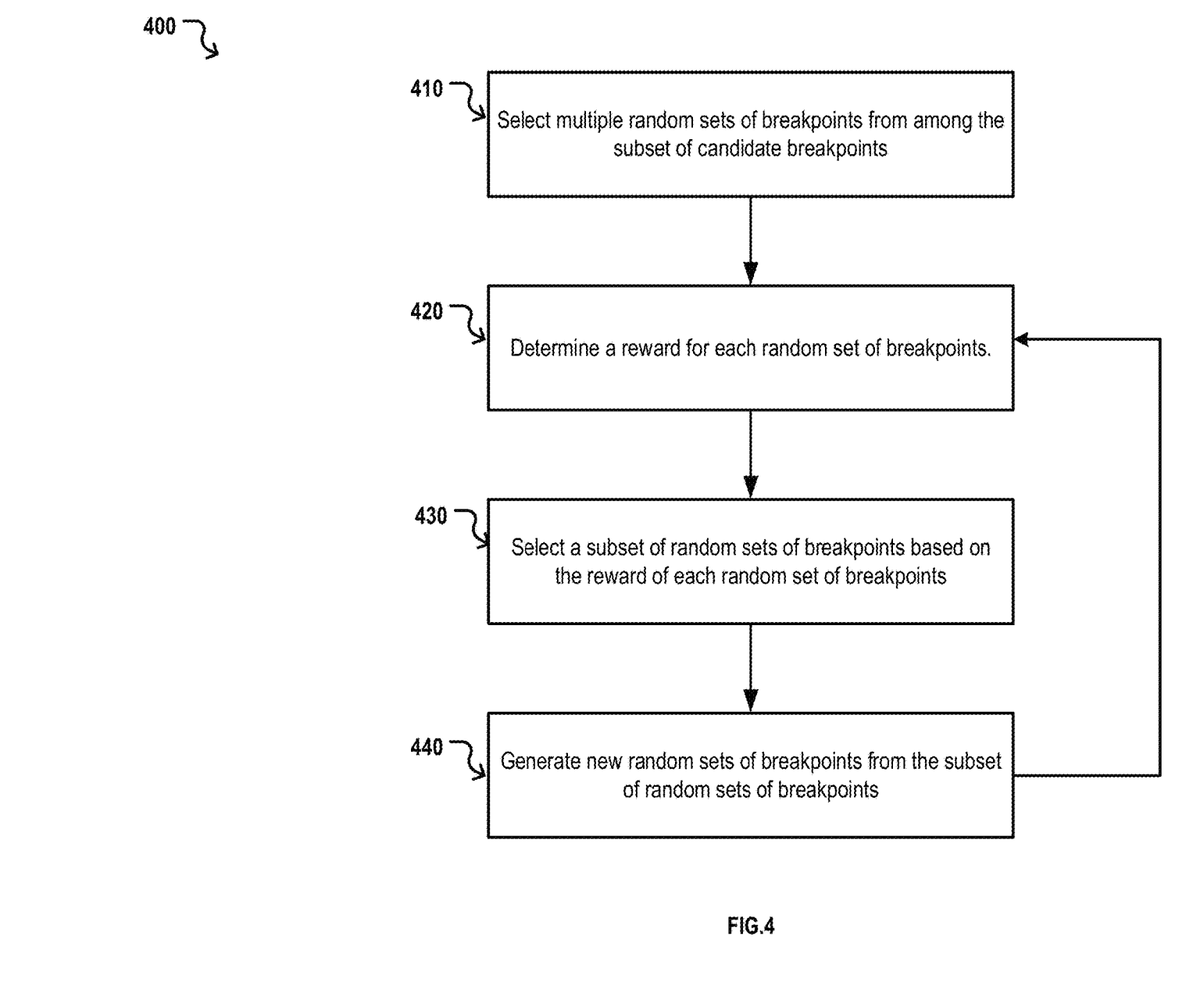
FIG. 4 is a flow chart of an example process for selecting the final set of breakpoints.

FIG. 4 is a flow chart of an example process 400 for selecting the final set of breakpoints. The machine learning scoring discussed above focuses on analyzing individual candidate breakpoints and the portion of the media item within a specified distance from the breakpoint. However, the process 400, which is used to select the final set of breakpoints from among the candidate breakpoints, takes into consideration other breakpoints that might be a part of the final set of breakpoints. Operations of the process 400 can be implemented, for example, by the breakpoint management system 160 of FIG. 1, or one or more data processing apparatus. Operations of the process 400 can also be implemented as instructions stored on a computer readable medium, where execution of the instructions can cause one or more data processing apparatus to perform operations of the process 400.

Multiple random sets of breakpoints are selected from among the subsets of candidate breakpoints (410). The number of breakpoints in each of the multiple random sets of breakpoints is a design choice that may be set by the designer (or administrator) of the system. For example, the designer of the system may set rules and/or heuristics that dictate the number of breakpoints for a given length of the media item. For example, the designer of the system may choose to provide two digital components for a media item that has a playback duration of 5 minutes.

In some implementations, a machine learning and/or algorithmic process can be implemented to predict the number of breakpoints that is included in each of the multiple random sets of breakpoints for a media item. In some implementations, different features of the media item can be used to determine the number of breakpoints in each of the multiple random sets of breakpoints for the media item. For example, if the number of views for a particular media item such as a video is higher than other media items, the designer of the system may select a higher number of breakpoints for the particular media item.

Continuing with the example of the media item MI_3, where the operation 230 selected the subset of candidate breakpoints (BP_1, BP_2, BP_3 and BP_5) from the candidate set of breakpoints using the machine learning model. As seen in O-210 and O-230, the playback length of the media item MI_3 is t6. Assume that the number of breakpoints allowed for the media item of length t6 is two. In such a scenario, multiple random sets of breakpoints may include different combinations of two breakpoints (for e.g., [BP_1, BP_3], [BP_2, BP_3], [BP_2, BP_5]) from among the four breakpoints BP_1, BP_2, BP_3 and BP_5.

A reward is determined for each of the multiple random sets of breakpoints (420). In some implementations, the reward for the random set of breakpoints is determined based on a difference between (i) a watch-weighted sum and (ii) a spacing penalty corresponding to a proximity of each candidate breakpoint in the random set of breakpoints to other candidate breakpoints in the random set of breakpoints.

In some implementations, the watch-weighted sum for a random set of breakpoints is determined based on the score generated by the machine learning model for each candidate breakpoint in the random set of breakpoints (as discussed with reference to 220) and a watch time weight feature for that candidate breakpoint. The watch time weight feature can be expressed as the percentage and/or ratio of the number of users that were still watching the media item at the location of the candidate breakpoint during previous presentations of the media item. In some implementations, the watch time weight feature for a candidate breakpoint can be modeled as a linear and/or nonlinear equation such that the parameters of the linear and/or non-linear equation satisfies the relationship between the number of users that are continuing to view the media item at any time stamp within the playback duration of the media item based on the prior views.

For example, assume that a particular media item such as a video with a playback duration of four minutes has been previously presented to 100 users. Based on the viewing activity of the users, the system can conclude that a certain number of users stop viewing the media item after a certain period of time. For instance, assume that 30 users out of 100 viewed the video for more than 2 minutes and the remaining 70 users stopped viewing the video before 2 minutes. In such a scenario, the watch time weight feature for a breakpoint at 2 minutes from the start of the media item can be expressed as a fraction of users that have watched the video for more than 2 minutes. In some implementations, the watch-weighted sum for a random set of breakpoints takes the form $\Sigma_{i=0}{}^n S_i w_i$ where $S_i$ is the score output by the machine learning model for the candidate breakpoint i, and $w_i$ is the watch time weight feature of the candidate breakpoint i in the random set of breakpoints.

The spacing penalty is an offset that penalizes the reward function when the timestamps associated with breakpoints in the random set of breakpoints are closer to each other. In some implementations, the spacing penalty can take the following form $$-\sum_{i=1}^{n} 0.6 * \text{Max}\left(1 - \frac{P_i - P_{i-1} - \min \text{Spacing}}{\text{avg Spacing} - \min \text{Spacing}}, 1\right) * S_i w_i$$

where $P_i$ is the timestamp (e.g., location within the media item) of breakpoint i, $P_i$–$P_{i-1}$ is the spacing between two timestamps of candidate breakpoints within the media item in a random set of breakpoints, minSpacing is the minimum amount of spacing allowed between two breakpoints in a random set of breakpoints, avgSpacing=1.663 log(x)–0.030.

A subset of random sets of breakpoints is selected based on the reward of each random set of breakpoints (430). Depending on the implementation, the reward for a random set of breakpoints can be expressed using any appropriate scale. For example, assume that the reward for of a particular random set of breakpoints is a number on a scale from 0-10, where a number closer to 0 indicates that the particular random set of breakpoints has a lower determined goodness score compared to a number closer to 10. In such implementations, a prior threshold may be set by the designer (or administrator) of the system. In these implementations, only those random sets of breakpoints that have a reward more than the prior threshold may be selected for inclusion in the subset.

Continuing with the example of the media item MI_3, assume that the multiple random sets of breakpoints includes three random sets [BP_1, BP_3], [BP_2, BP_3] and [BP_2, BP_5]. Also assume that the random set of breakpoints [BP_1, BP_3], [BP_2, BP_3] and [BP_2, BP_5] have a reward of 8, 3 and 6 respectively. In such a scenario, two random sets of breakpoint [BP_1, BP_3] and [BP_2, BP_5] are selected for the subset of random sets of breakpoints based on the individual rewards that is greater than prior threshold that was set at 5.

New random sets of breakpoints are generated from the subset of random sets of breakpoints (440). In some implementations, the breakpoints in the subset of random sets of breakpoints for a particular media item are randomly selected to generate new combinations of random sets of breakpoints. Continuing with the example of the media item MI_3, the subset of random sets breakpoints that was selected by process 430 includes [BP_1, BP_3], [BP_2, BP_5]. In such an example, the new random set of breakpoints may include [BP_1, BP_2] and [BP_3, BP_5].

In some implementations, the sets of random breakpoints in the subset of random sets of breakpoints are optionally modified by moving a breakpoint of a particular set of random breakpoints by a pre-determined amount of distance along the playback duration of the media item to generate new random sets of breakpoints. For example, assume that a particular set of breakpoints in the subset of random sets of breakpoints includes [BP_3, BP_5. Also assume that the designer (or administrator) of the system may set the pre-determined amount of distance as t seconds. In such a case, new random sets of breakpoints generated by modifying the random set of breakpoints [BP_3, BP_5] may include all sets of breakpoints [BP_2±t, BP_5±t]. In such implementations, the new random sets of breakpoints are further analyzed to generate a reward (e.g., as discussed with reference to 420).

The process 400 can be an iterative process where the number of iterations can be set by the designer (or administrator) of the system. For example, the designer may opt to set the maximum number of iterations of the process at 20 iterations, or some other appropriate number of iterations. Continuing with the example of the media item MI_3, assume that after 20 iterations, the subset of random sets of breakpoints includes [BP_1, BP_2] and [BP_3, BP_5+t] such that [BP_1, BP_2] has a reward of 8 and [BP_3, BP_5+t] has a reward of 7. In such a scenario, the set of breakpoints with the highest reward can be selected as the final set of breakpoints for a particular media item. In the present example, the set [BP_1, BP_2] is selected as the final set of breakpoints for the media item MI_3.

Returning to FIG. 2, the final set of breakpoints for a media item are stored in the database (250). For example, after determining the final set of breakpoints BP_1 and BP_2 for the media item MI_3, the breakpoints are stored in the media database 130. Similarly, breakpoints of other media items MI_1, MI_2, MI_4 and MI_5 can be stored in the media database as a list that can be accessed using information regarding the corresponding media item.

Digital component(s) are provided to a client device (260). In some implementations, the digital components are provided for presentation at the client device when playback of the media item reaches a given breakpoint among the final set of breakpoints stored for the media item. As previously discussed, at least one of the digital components is not included in the media item.

In some situations, the digital component(s) (e.g., one or more digital components) can be provided to the client device in response to the client device 150A requesting the media item. For example, the digital components can be selected based on information about the requested media item, information about the client device at which the requested media item will be presented, and/or information about the user that will be presented the media item.

In some situations, the digital component(s) are provided in response to a request for digital components that is separate from the request for the media item. For example, while presenting the media item, the client device can generate a request for digital components to present the user. For example, as discussed with reference to FIG. 1, the client device 150A can generate two requests (one for each of the two breakpoints BP_1 and BP_2) for digital components 116a and 116b respectively. The digital component system 120 after receiving the request for digital components 116a and 116b generates two responses 118a and 118b respectively (one for each of the two requests 116a and 116b). Each response includes one or more digital components. The client device 150A after receiving the responses 118a and 118b presents the digital components during the breakpoints BP_1 and BP_2, respectively.

In some implementations, instead of storing the final set of breakpoints for media items in a media database 130, the breakpoint management system 160 can be implemented such that every time there is request from a client device 150 for a particular media item, the particular media item is analyzed by the breakpoint management system 160 to determine the final set of breakpoints before the media item is transmitted to the client device for presentation via the network 110. In other implementations, the breakpoint management system 160 can analyze the particular media item in parallel while the client device 150 is presenting the media item and provide the client device 150 the final set of breakpoints at a later point of time but before the end of the presentation of the media item.

In some implementations, the breakpoint management system 160 can also be implemented on the client device 150. In such a scenario, the client device 150 can generate a request for media item and in response receive the media item from the media database 130. After receiving the media item, the client device may analyze the media item to determine the final set of breakpoints, generate a request for digital components, and in response receive digital components for presentation the user.

Figure 5:
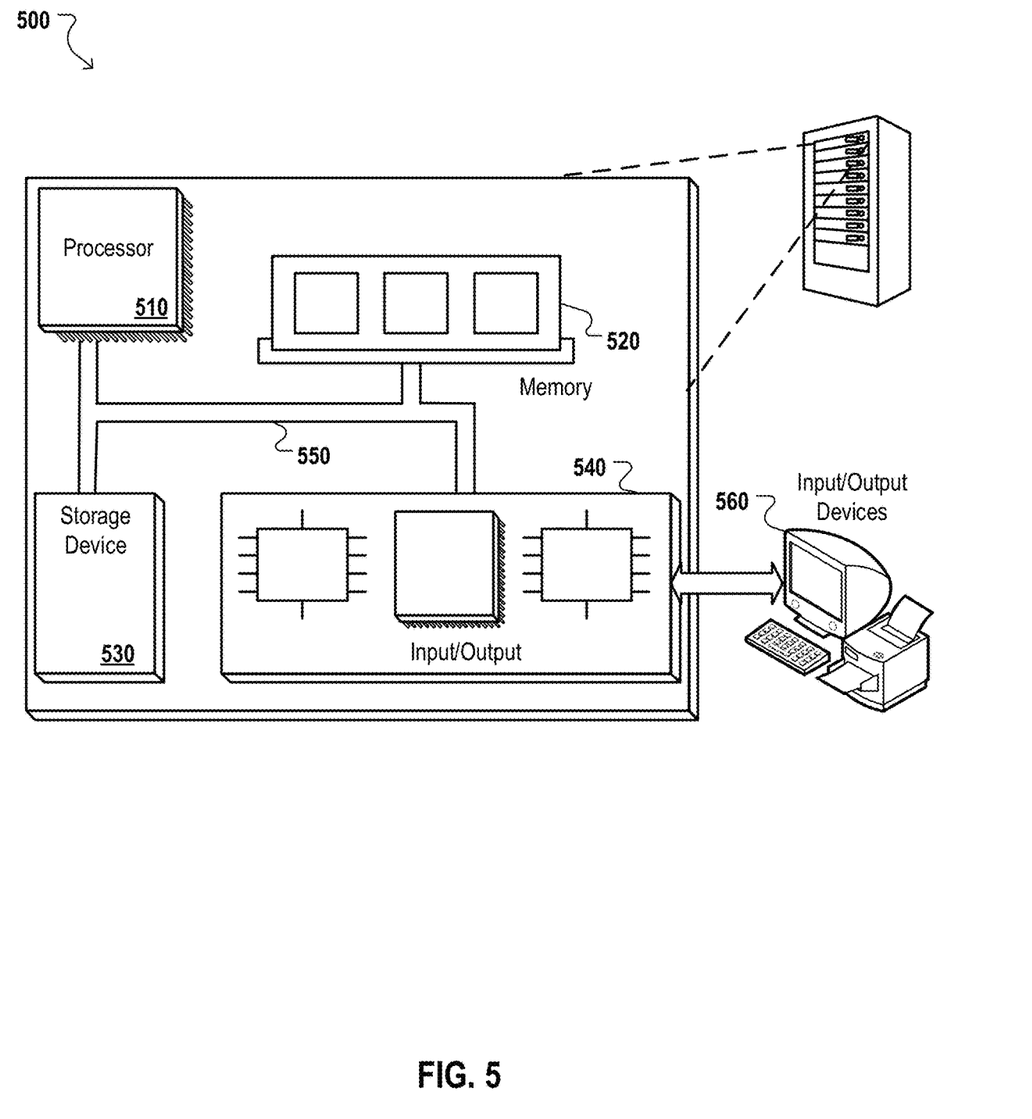
FIG. 5 is a block diagram of an example computer system that can be used to perform operations described.

FIG. 5 is block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In some implementations, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In some implementations, the memory 520 is a volatile memory unit. In another implementation, the memory 520 is a non-volatile memory unit.

The storage device 530 is capable of providing mass storage for the system 500. In some implementations, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In some implementations, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to peripheral devices 560, e.g., keyboard, printer and display devices. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   determining, by one or more computing devices, a set of candidate breakpoints within a media item;
   determining a first set of features of multiple entities detected within a portion of the media item that is within a specified distance of a first candidate breakpoint;
   determining, for the first candidate breakpoint, a second set of features representing presentation features of the media item at different incremental distances from the first candidate breakpoint, wherein the second set of features is different from the first set of features of the first candidate breakpoint;
   generating, using a machine learning model, a score for the first candidate breakpoint based on the first set of features and the second set of features;
   selecting a final set of breakpoints from among the set of candidate breakpoints based on a combination of a score generated by the machine learning model for each particular candidate breakpoint in the set of candidate breakpoints and a location of the particular candidate breakpoint relative to a different candidate breakpoint in the set of candidate breakpoints; and during playback of the media item, providing, to a client device, a digital component that is presented at the client device when the media item reaches a given breakpoint among the final set of breakpoints stored for the media item, wherein the digital component is not part of the media item.

2. The method of claim 1, further comprising creating the machine learning model, including:
  generating a set of training data based on the first set of features, the second set of features and a ground truth score; and
  adjusting a plurality of trainable parameters of the machine learning model using the set of training data to generate a trained machine learning model that outputs a breakpoint score indicative of a level of disruption that will be caused by inserting a breakpoint at a particular location during playback of the media item.

3. The method of claim 2, wherein the machine learning model comprises bi-directional gradient recurring unit and fully connected neural network layers.

4. The method of claim 1, wherein selecting the final set of breakpoints comprises:
  selecting multiple random sets of breakpoints from among the set of candidate breakpoints;
  determining a reward for each random set of breakpoints from among the multiple random sets of breakpoints;
  selecting a subset of random sets of breakpoints from among the multiple random sets of breakpoints based on the reward of each random set of breakpoints; and
  generating new random sets of breakpoints from the subset of random sets of breakpoints.

5. The method of claim 4, wherein determining a reward for the random set of breakpoints comprises determining the reward based on a difference between (i) a watch-weighted sum of the score generated by the machine learning model for each candidate breakpoint in the random set of breakpoints and (ii) a spacing penalty corresponding to a proximity of each candidate breakpoint in the random set of breakpoints to other candidate breakpoints in the random set of breakpoints.

6. The method of claim 1, wherein determining a candidate set of breakpoints comprises filtering out breakpoints that are within a specified distance from a start of the media item or that occur while speech is being presented by the media item.

7. A system, comprising:
  a data storage device storing instructions; and
  one or more computing devices configured to execute instructions that, upon execution, cause the one or more computing devices to perform operations comprising:
    determining a set of candidate breakpoints within a media item;
    determining a first set of features of multiple entities detected within a portion of the media item that is within a specified distance of a first candidate breakpoint;
    determining, for the first candidate breakpoint, a second set of features representing presentation features of the media item at different incremental distances from the first candidate breakpoint, wherein the second set of features is different from the first set of features of the first candidate breakpoint;
    generating, using a machine learning model, a score for the first candidate breakpoint based on the first set of features and the second set of features;
    selecting a final set of breakpoints from among the set of candidate breakpoints based on a combination of a score generated by the machine learning model for each particular candidate breakpoint in the set of candidate breakpoints and a location of the particular candidate breakpoint relative to a different candidate breakpoint in the set of candidate breakpoints; and
    during playback of the media item, providing, to a client device, a digital component that is presented at the client device when the media item reaches a given breakpoint among the final set of breakpoints stored for the media item, wherein the digital component is not part of the media item.

8. The system of claim 7, wherein the instructions cause the one or more computing devices to perform operations further comprising creating the machine learning model, including:
  generating a set of training data based on the first set of features, the second set of features and a ground truth score; and
  adjusting a plurality of trainable parameters of the machine learning model using the set of training data to generate a trained machine learning model that outputs a breakpoint score indicative of a level of disruption that will be caused by inserting a breakpoint at a particular location during playback of the media item.

9. The system of claim 8, wherein the machine learning model comprises bi-directional gradient recurring unit and fully connected neural network layers.

10. The system of claim 7, wherein selecting the final set of breakpoints comprises:
  selecting multiple random sets of breakpoints from among the set of candidate breakpoints;
  determining a reward for each random set of breakpoints from among the multiple random sets of breakpoints;
  selecting a subset of random sets of breakpoints from among the multiple random sets of breakpoints based on the reward of each random set of breakpoints; and
  generating new random sets of breakpoints from the subset of random sets of breakpoints.

11. The system of claim 10, wherein determining a reward for the random set of breakpoints comprises determining the reward based on a difference between (i) a watch-weighted sum of the score generated by the machine learning model for each candidate breakpoint in the random set of breakpoints and (ii) a spacing penalty corresponding to a proximity of each candidate breakpoint in the random set of breakpoints to other candidate breakpoints in the random set of breakpoints.

12. The system of claim 7, wherein determining a candidate set of breakpoints comprises filtering out breakpoints that are within a specified distance from a start of the media item or that occur while speech is being presented by the media item.

13. A non-transitory computer readable medium storing instructions that, when executed by one or more data processing apparatus, cause the one or more data processing apparatus to perform operations comprising:
  determining a set of candidate breakpoints within a media item;
  determining a first set of features of multiple entities detected within a portion of the media item that is within a specified distance of a first candidate breakpoint;
  determining, for the first candidate breakpoint, a second set of features representing presentation features of the media item at different incremental distances from the first candidate breakpoint, wherein the second set of features is different from the first set of features of the first candidate breakpoint;

generating, using a machine learning model, a score for the first candidate breakpoint based on the first set of features and the second set of features;

selecting a final set of breakpoints from among the set of candidate breakpoints based on a combination of a score generated by the machine learning model for each particular candidate breakpoint in the set of candidate breakpoints and a location of the particular candidate breakpoint relative to a different candidate breakpoint in the set of candidate breakpoints; and during playback of the media item, providing, to a client device, a digital component that is presented at the client device when the media item reaches a given breakpoint among the final set of breakpoints stored for the media item, wherein the digital component is not part of the media item.

14. The non-transitory computer readable medium of claim 13, wherein the instructions cause the one or more data processing apparatus to perform operations further comprising creating the machine learning model, including:

generating a set of training data based on the first set of features, the second set of features and a ground truth score; and adjusting a plurality of trainable parameters of the machine learning model using the set of training data to generate a trained machine learning model that outputs a breakpoint score indicative of a level of disruption that will be caused by inserting a breakpoint at a particular location during playback of the media item.

15. The non-transitory computer readable medium of claim 14, wherein the machine learning model comprises bi-directional gradient recurring unit and fully connected neural network layers.

16. The non-transitory computer readable medium of claim 13, wherein selecting the final set of breakpoints comprises:

selecting multiple random sets of breakpoints from among the set of candidate breakpoints;

determining a reward for each random set of breakpoints from among the multiple random sets of breakpoints;

selecting a subset of random sets of breakpoints from among the multiple random sets of breakpoints based on the reward of each random set of breakpoints; and generating new random sets of breakpoints from the subset of random sets of breakpoints.

17. The non-transitory computer readable medium of claim 16, wherein determining a reward for the random set of breakpoints comprises determining the reward based on a difference between (i) a watch-weighted sum of the score generated by the machine learning model for each candidate breakpoint in the random set of breakpoints and (ii) a spacing penalty corresponding to a proximity of each candidate breakpoint in the random set of breakpoints to other candidate breakpoints in the random set of breakpoints.

18. The non-transitory computer readable medium of claim 13, wherein determining a candidate set of breakpoints comprises filtering out breakpoints that are within a specified distance from a start of the media item or that occur while speech is being presented by the media item.

* * * * *